(12) United States Patent
Vinck et al.

(10) Patent No.: US 8,939,265 B2
(45) Date of Patent: Jan. 27, 2015

(54) DISC BRAKE PROVIDED WITH A MOVEMENT-CONVERTING CARTRIDGE

(75) Inventors: Jan Vinck, Beaufort en Vallee (FR); Fabien Chaigneau, Rochefort sur Loire (FR); William Gosse, Fontaine Guerin (FR)

(73) Assignee: Chassis Brakes International B.V., Amsterdam (NL)

( * ) Notice: Subject to any disclaimer, the term of this patent is extended or adjusted under 35 U.S.C. 154(b) by 37 days.

(21) Appl. No.: 13/880,927

(22) PCT Filed: Sep. 19, 2011

(86) PCT No.: PCT/EP2011/066219
§ 371 (c)(1),
(2), (4) Date: Apr. 22, 2013

(87) PCT Pub. No.: WO2012/052239
PCT Pub. Date: Apr. 26, 2012

(65) Prior Publication Data
US 2013/0206518 A1 Aug. 15, 2013

(30) Foreign Application Priority Data
Oct. 22, 2010 (FR) ...................................... 10 04172

(51) Int. Cl.
*F16D 55/08* (2006.01)
*F16D 55/26* (2006.01)
(Continued)

(52) U.S. Cl.
CPC ............ *F16D 55/226* (2013.01); *F16D 65/183* (2013.01); *F16D 2121/02* (2013.01);
(Continued)

(58) Field of Classification Search
CPC ........... F16D 1/00; F16D 11/00; F16D 11/02; F16D 11/08; F16D 11/14; F16D 11/16; F16D 2121/14; F16D 2121/16; F16D 55/02; F16D 55/08; F16D 55/16; F16D 55/22; F16D 55/226

USPC ....................................... 188/72.1, 72.4–72.8
See application file for complete search history.

(56) References Cited

U.S. PATENT DOCUMENTS 6,988,596 B2 * 1/2006 Gerard et al. ................ 188/72.8
2004/0245055 A1 * 12/2004 Gerard et al. ................ 188/72.6
(Continued)

FOREIGN PATENT DOCUMENTS

EP 1936227 6/2008
WO 01/34991 5/2001

OTHER PUBLICATIONS

International Search Report for Application No. PCT/EP2011/066219 dated Mar. 29, 2012 (2 pages).

*Primary Examiner* — Vishal Sahni
(74) *Attorney, Agent, or Firm* — Michael Best & Friedrich LLP

(57) ABSTRACT

A disc brake comprising a floating stirrup and a brake piston controlled via a motion conversion cartridge (200) comprising a rear part pressed against the bottom (114) of the housing (113) in the stirrup (100) and a control shaft (220) passing through the bottom. The front part (260) of the cartridge is pressed against the brake piston. It comprises a piston (270) provided with a plate cooperating with the plate of the control shaft (220) with the interposition of balls cooperating with tracks in the form of ramps to transform the relative rotational motion of one plate relative to the other into a translational motion of the piston (270). The cartridge (200) is held in place in its housing (113) by a cage (290) elastically attached to the wall (117, 118) of the housing (113). The piston (274) comprises longitudinal ribs (174) that fit in longitudinal grooves (119) produced in the wall of the housing (113) and thus ensuring the blocking of the rotation of the conversion piston (270) while allowing its translational motion.

7 Claims, 3 Drawing Sheets

Figure 1:
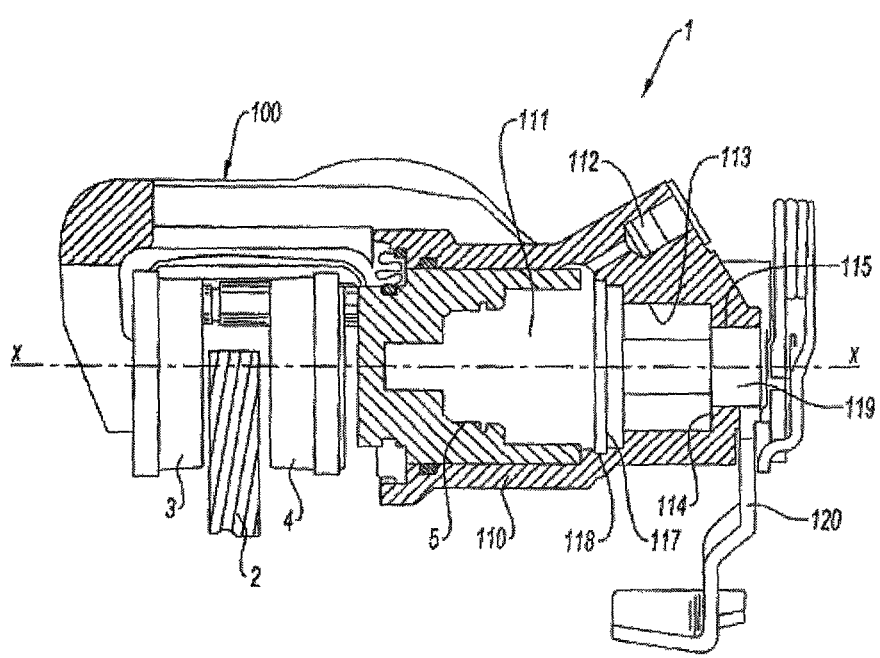

(51) Int. Cl.
  *F16D 55/226* (2006.01)
  *F16D 65/18* (2006.01)
  *F16D 121/02* (2012.01)
  *F16D 121/14* (2012.01)
  *F16D 125/36* (2012.01)
  *F16D 121/04* (2012.01)
  *F16D 123/00* (2012.01)
  *F16D 127/06* (2012.01)
  *F16D 131/00* (2012.01)
(52) U.S. Cl.
  CPC ......... *F16D2121/14* (2013.01); *F16D 2125/36* (2013.01); *F16D 2121/04* (2013.01); *F16D 2123/00* (2013.01); *F16D 2127/06* (2013.01); *F16D 2131/00* (2013.01)
  USPC ........................................ 188/72.6; 188/72.1

(56) References Cited

U.S. PATENT DOCUMENTS

| | | | |
|---|---|---|---|
| 2004/0262097 A1* | 12/2004 | Gerard et al. | 188/72.8 |
| 2005/0034935 A1 | 2/2005 | Maehara | |
| 2008/0283345 A1* | 11/2008 | Balz et al. | 188/72.6 |
| 2013/0206519 A1* | 8/2013 | Vinck et al. | 188/72.4 |

* cited by examiner

DISC BRAKE PROVIDED WITH A MOVEMENT-CONVERTING CARTRIDGE

FIELD OF THE INVENTION

The present invention relates to a disc brake comprising a floating stirrup straddling the brake disc bearing a fixed shoe and forming a cylinder housing a piston bearing a mobile shoe for clamping the brake disc, the piston being controlled by the hydraulic circuit and by the parking brake system via a motion conversion cartridge transforming the pivoting motion of the hand brake lever, borne by the stirrup, into a translational motion to push the brake piston, the cylinder having a front part housing the brake piston and a rear part forming a housing receiving the conversion cartridge, with a shape of revolution, coming against the mobile shoe and the bottom of the cylinder, the cartridge passing, in a seal-tight manner, through an axial orifice of the bottom of the cylinder to link its control shaft to the lever of the parking brake.

STATE OF THE ART

Such a disc brake, described in the document EP 1 936 227, is already known. This document relates notably to a method for the assembly of a disc brake and in particular the assembly of the cartridge converting the rotational motion of the hand brake lever into a translational motion of the brake piston in order to apply the parking brake or release it.

In this setup, the rear part of the cartridge comprises a pin that fits into a hole in the bottom of the housing receiving the cartridge in the cylinder of the brake stirrup. This implementation is relatively complicated both to manufacture and to install, and the pin is subject to significant rotational forces during the actuation of the hand brake.

AIM OF THE INVENTION

The aim of the present invention is to simplify the manufacture of the brake stirrup by reducing the number of parts forming the motion conversion cartridge and the manufacture of the stirrup.

EXPLANATION AND ADVANTAGES OF THE INVENTION

To this end, the invention relates to a disc brake of the type defined above, characterized in that
A) the conversion cartridge comprises:
  $A_1$) a rear part pressed against the bottom (114) of the housing of the cylinder and consisting of:
    a bearing in the form of a sleeve provided with a flange pressed around a through-orifice of the bottom of the housing partially passed through by the sleeve, and
    a control shaft linked to the pivoting lever and bearing a first plate,
  $A_2$) a front part pressed against the brake piston, mobile in translation relative to the cylinder but blocked in rotation,
    the front part consisting of:
      a piston provided with a second plate intended to cooperate with the first plate of the control shaft with the interposition of mobile balls in ramps in the two plates to transform the relative rotational motion between the two plates into a translational motion of the piston, and
      a cage retaining the conversion piston in the cylinder via a clip and a return spring interposed between the cage and the piston acting against the translational motion generated by the plates and the balls,
B) the cylinder comprises, in its rear part forming the housing receiving the conversion cartridge, at least one longitudinal groove and the conversion piston comprises, at its periphery, a longitudinal rib of a section complementing that of the longitudinal groove, to cooperate therewith and block the rotation of the front part of the cartridge while leaving it free in translation.

Thus, the blocking of the rotation (or anti-rotation effect) of the piston of the converter, that is to say of the mobile nut of the converter, is produced directly on the stirrup without requiring intermediate parts since the rotational blocking is obtained by the longitudinal rib or ribs borne by the front part of the cartridge and the matching longitudinal groove or grooves produced in the housing of the cartridge in the stirrup.

The rear box of the cartridge and its anti-rotation pin intended to be placed in a hole at the bottom of the stirrup is thus very advantageously eliminated.

Thus, this box or cage of the rear part is replaced by a simple rear bearing with L-shaped section. The elimination of the cage of the rear part enhances the ability to bleed the brake circuit since there is no part enclosed in the motion converter according to the invention. This simplifies the production of the cage, and shortens the length of the cylinder or stock of the stirrup receiving the cartridge.

The invention also simplifies the assembly of the cartridge which is done directly on the assembly line of the brake and a machine dedicated to the preparation of the assembled cartridge is thus eliminated. There is no longer any clipping of the cage onto the rear box thereby eliminating the risk of the formation of chips.

Finally, this embodiment can be applied to pistons of a smaller diameter than that of the pistons used currently with identical piston forces.

According to another advantageous feature, the housing of the cartridge in the stirrup comprises three longitudinal grooves and the piston is provided with three longitudinal ribs (branches), the grooves being distributed equi-angularly and the ribs being in positions matching those of the grooves.

These three longitudinal grooves and the three longitudinal ribs of the converter piston allow for an excellent blocking of the rotation of the converter piston while avoid the problems associated with the significant torque which can be applied to the conversion piston by the link consisting of the ball transmission between the plates. This excellent rotation blocking also favours the return of the conversion piston when the parking brake is released.

According to another advantageous feature, at least one groove of the housing has an arc-of-circle section, and in particular a half-circle section, and the rib borne by the piston of the converter has a section in the form of an arc of circle equal to that of the groove. This form of the grooves and ribs is very easy to produce, in particular the machining of each groove.

According to another advantageous feature, the longitudinal rib consists of a branch extending beyond the plate towards the rear and straddling at least a fraction of axial length of the rear part.

The length of the longitudinal rib thus formed by a branch and above all the length of the longitudinal ribs, preferably three of them, of the conversion piston, allow for an excellent guiding and excellent holding of the piston in the stirrup. The branches protruding towards the rear make it possible to reduce the axial length of the conversion cartridge without this being detrimental to the guidance, all the more so as the branches are both held by the rear bearing and the plate of the control shaft of the cartridge, which are housed in the free space surrounded by the branches. In these conditions, even subject to a force which could be violent, the branches cannot leave their grooves since they are held therein, in a way blocked, by the presence of the rear part of the cartridge.

According to another advantageous feature, the housing of the cartridge comprises a shoulder receiving, bearing on it, the flange of the cage and a peripheral groove to receive the clip.

According to another advantageous feature, the cage is a part made of elastic steel of overall tapered form having a bottom in the form of a ring bearing blades linked to a flange and intermediate blades, with free ends, receiving the clip.

This cage and the cooperation of the cage on the one hand with the shoulder and on the other hand with the peripheral groove receiving the clip allow for an excellent secure attachment of the conversion cartridge in its housing of the stock of the stirrup. This attachment is secure and cannot be opened by itself. It requires a particular tool such as a sleeve, bearing on the tapered form of the cage, to progressively tighten the blades of the cage and thus make it possible, by the re-entrant motion, to retract the flange and release it from its groove. The fitting is done in the same conditions, but in the reverse order.

Overall, the disc brake equipped with such a motion conversion cartridge is simple to produce and to assembly by virtue of the small number of parts. It allows for an excellent operation of the brake and guarantees the reliability thereof.

DRAWINGS

Figure 2A:
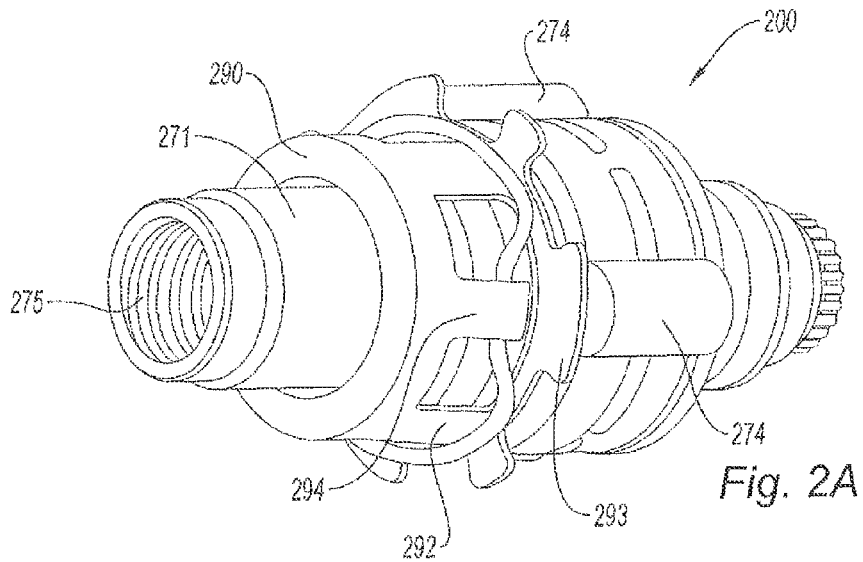
Figure 2B:
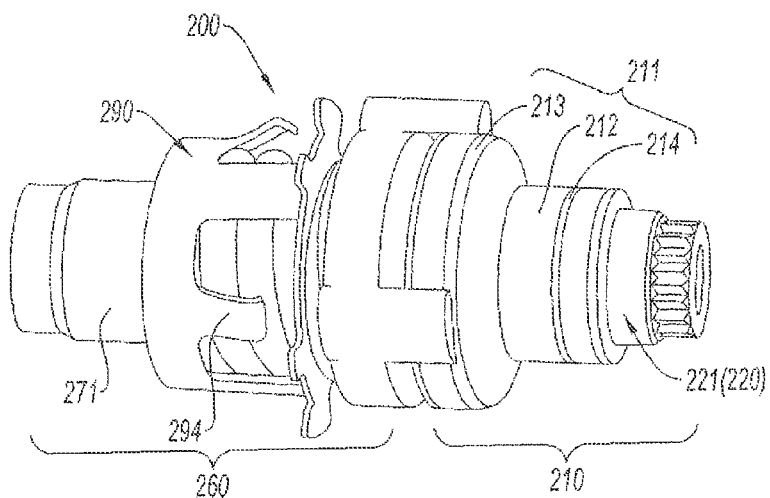
Figure 3:
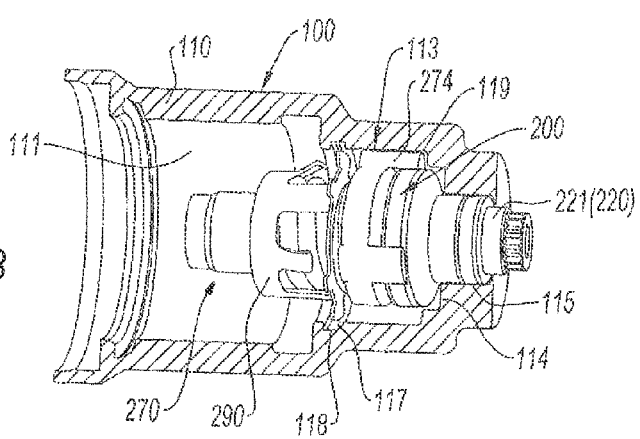
Figure 4:
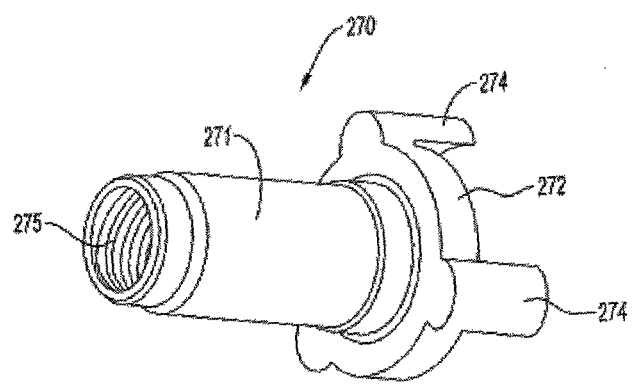
Figure 5:
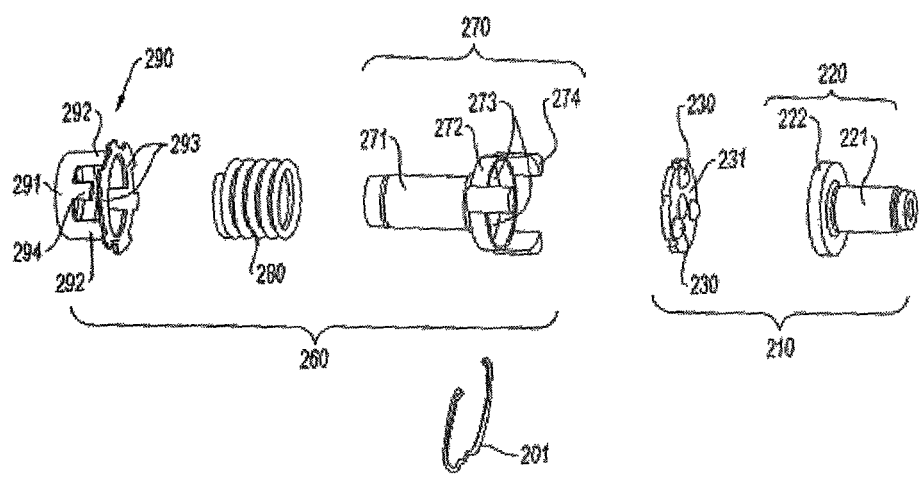

The present invention will be described hereinbelow in more detail using the appended drawings in which:

FIG. 1 is a schematic cross-sectional view of a brake stirrup placed on the brake disc, showing the brake piston without the conversion cartridge, FIG. 2 shows, in its parts 2A and 2B, two perspective views from opposite directions of the conversion cartridge, FIG. 3 is an axial cross-sectional view of the cylinder of the brake stirrup and of the fitting of the conversion cartridge, the latter not being cut, FIG. 4 is a perspective view of the piston of the conversion cartridge, FIG. 5 is an exploded view of the main components of the conversion cartridge.

DESCRIPTION OF AN EMBODIMENT OF THE INVENTION

By convention, to simplify the description of the disc brake according to the invention, the orientation that will be used is the orientation given by the axis xx of FIG. 1, the left side of which is directed towards what is considered to be the front, and the right side of which is directed towards what is considered to be the rear: thus, the front of the brake piston is turned towards its brake shoe and the rear of the brake piston is turned towards its housing in the stirrup. Similarly, the motion converter will have a front part on the side of the brake piston and a rear part on the side of the bottom of its housing in the stirrup.

According to FIGS. 1 and 2A, 2B, the invention relates to a disc brake 1 associated with the braking circuit and with the control of the parking brake. The floating stirrup 100 straddles the brake disc 2 and bears a fixed shoe 3 and a mobile shoe 4. The latter is actuated by a brake piston 5 housed in the cylinder (or stock) of the stirrup 100. The cylinder 110 delimits a seal-tight chamber 111 linked to the brake circuit by a connection 112 which is not detailed. This seal-tight chamber 111 also houses a motion conversion cartridge 200 (FIGS. 2A, B) applied against the bottom 114 of the housing 113 of the cylinder of the stirrup. The housing 113 extends the cylinder 110 of the brake piston. The bottom 114 is provided with an orifice 115 that the end of the cartridge 200 passes through in a seal-tight manner (FIG. 3) for the driving link with the pivoting lever 120 linked to the control of the hand brake, the rotational (pivoting) motion of which will be transformed into a translational motion applied to the brake piston 5.

The motion conversion cartridge 200 represented in FIGS. 2A-5 consists of a rear part 210 and a front part 260.

The rear part 210 is itself formed by a bearing 211 with T-shaped section comprising a sleeve 212 provided with a flange 213. The sleeve 211 is placed in the orifice 115 of the bottom 114 of the stirrup 100 and its flange 213 is pressed onto the surface of the bottom 114 surrounding the orifice 115. This bearing 211, provided with an O-ring seal 214 to ensure the seal-tightness with respect to the orifice 115, receives a control shaft 220 consisting of a cylindrical part 221 terminated at the front by a first plate 222. The cylindrical part 221 passes through the sleeve 212 of the bearing 211 to protrude at the rear of the stirrup and receive the actuation lever 120 of the hand brake. The plate 222 is pressed against the flange 213 of the bearing 211. The front face of the plate 222 is provided with grooves of variable depth to cooperate with balls 230 borne by a cage 231, these balls themselves cooperating in the same conditions with the translationally mobile conversion piston 270.

The front part 260 of the converter 200 consists of the conversion piston 270 consisting of a sleeve 271 bearing, at the rear, a second plate 272 provided with grooves of variable depth 273, complementing, in their arrangement and their form, those of the grooves of variable depth (not visible) of the first plate 222 of the control shaft 220. The balls 230, of which there are, for example, three, of the cage 231 are intended to roll in the matching grooves of the plate 222 of the control shaft 220 and of that 272 of the piston 270 to transform the rotational motion of the plate 222 of the control shaft 220 into a translational motion of the conversion piston 270 by the play of the complementary ramps formed by the grooves as is known per se. The front part 260 also comprises a compression spring 280 fitted onto the cylindrical sleeve 271 of the conversion piston and pressed on the one hand against the plate 272 of the piston 270 and on the other hand against the bottom 291 of a cage 290 also installed on the sleeve 271 of the piston 270.

The cage 290 is a part made of elastic steel of overall tapered form comprising a ring forming the bottom 291 on the front side, bearing blades 292 linked in pairs to the two parts of a slotted flange 293 facing outwards and intermediate blades 294, which are free. A clip 201 is installed in the cage 290 around and between the blades 292, 294, to retain the converter 200 in its housing 113 of the stirrup 100. For fitting in a manner that is known per se, the slotted flange 293 and the clip 201 are compressed using a sleeve-shaped tool. The clip 201 retains the cage 290 by cooperating with a peripheral groove 118 and the slotted flange 293 is placed in the housing 113 against a shoulder 117 in the stirrup 100 as in the mounting method described in the document EP 1 936 227 cited here for reference. The cartridge 200 is thus blocked in its housing 113 in one direction by its pressing via the slotted flange 293 against the shoulder 117 and in the opposite direction by the clip 201 attached in the peripheral groove 118, only the control rod 220 and the piston 270 remaining free to move.

The piston 270 (FIGS. 4, 5) includes one or more longitudinal ribs formed, in this example, by branches 274 which extend the plate 272 towards the rear. These branches 274, with semi-circular section, are housed by sliding in grooves 119 of corresponding section produced in the wall of the housing 113 of the stirrup 100 (FIG. 3) in positions matching those of the branches. There are preferably three of the branches 274, distributed equi-angularly around the axis xx of the housing 113. The piston 270 is thus blocked in rotation in the housing 113 while remaining free in translation. The branches 274 straddle the rear part 210 at the level of the edge of the plate 222 and of the flange 213 of the bearing 211. The disc forming the cage 231 holding the balls 230 is also maintained by the branches, which is important in the production of the subassembly consisting of the conversion cartridge and this makes its fitting in the housing 113 considerably easier.

After installation of the cartridge, the control shaft 220 and its plate 222 are, on the other hand, mounted free in rotation so that the rotational motion of the control shaft 220 is translated into a relative rotation of its plate 222 in relation to the plate 272 integrated with the piston 270 which produces the translational motion of the piston 270, transmitted to the brake piston 5.

The conversion piston 270 is pressed against the rear of the brake piston 5 by a wear compensator which is not represented, housed in the piston 270 forming a nut of a screw-nut link. The compensation of the wear of the brake shoes is obtained in a manner known to the person skilled in the art during the nut retraction motion, when the parking brake is released.

The cartridge 200 consists of a small number of parts and constitutes an assembled unit, ready to be installed in the stock of the brake stirrup 100. This fitting neither hampers nor complicates the subsequent installation of the brake piston and does not then disrupt the bleeding of the brake circuit.

The present invention relates to the field of motor vehicle disc brake systems.

PART LIST OF THE MAIN ELEMENTS 1 disc brake
2 brake disc
3 fixed shoe
4 mobile shoe
5 brake piston
17 peripheral groove of the housing
100 stirrup
110 cylinder
111 piston chamber
112 connection
113 housing
114 bottom of the housing
115 orifice of the bottom of the housing
117 shoulder
118 peripheral groove
119 groove
120 lever
200 motion conversion cartridge
201 clip
210 rear part of the cartridge
211 bearing with T-shaped section
212 sleeve
213 flange
214 O-ring seal
220 control shaft
221 cylindrical part
222 first plate
230 balls
231 cage receiving balls
260 front part of the cartridge
270 conversion piston
271 sleeve
272 second plate
273 grooves of variable depth
274 rib/longitudinal branch
275 nut
280 compression spring
290 cage
291 bottom
292 blade
293 slotted flange
294 intermediate blade

The invention claimed is:

1. A disc brake comprising:
a floating stirrup (100) straddling a brake disc (2) and supporting a fixed shoe (3);
a cylinder (110) that houses a brake piston (5) and supports a mobile shoe (4), wherein the fixed shoe (3) and the mobile shoe (4) are positioned to clamp the brake disc;
the brake piston (5) being controlled by a hydraulic circuit and by a parking brake system via a motion conversion cartridge (200), in that the motion conversion cartridge (200) transforms pivoting motion of a lever (120), borne by the floating stirrup (100), into a translational motion to push the brake piston (5),
the cylinder (110) having a front part that houses the brake piston (5) and a rear part forming a housing (113) that receives the conversion cartridge (200), the cartridge (200) passing, in a seal-tight manner, through an axial orifice of a bottom (114) of the cylinder to couple a control shaft of the conversion cartridge (200) to the lever (120) of a parking brake, characterized in that
A) the conversion cartridge (200) comprises:
A$_1$) a rear part (210) pressed against the bottom (114) of the housing (113) of the cylinder and comprising:
a bearing (211) in the form of a sleeve (212) provided with a flange (213), the bearing (211) being pressed around a through-orifice (115) of the bottom (114) of the housing (113), the sleeve (212) partially passing through the through-orifice (115), and
a control shaft (220) linked to the lever (120) and bearing a first plate (222),
A$_2$) a front part (260) pressed against the brake piston (5),
the front part (260) being permitted to translate relative to the cylinder (110), and the front part (260) being inhibited from rotating relative to the cylinder (110),
the front part (260) comprising:
a conversion piston (270) provided with a second plate (272) intended to cooperate with the first plate (222) of the control shaft (220) with an interposition of mobile balls (230) between the first plate (222) and the second plate (272), the mobile balls (230) being positioned on ramps (273) formed in the two plates (222, 272) to transform the relative rotational motion between the two plates (222, 272) into a translational motion of the conversion piston (270), and a cage (290) retaining the conversion piston (270) in the cylinder (110) via a clip (201) and a return spring (280) interposed between the cage and the conversion piston acting against the translational motion generated by the plates (222, 272) and the balls (230), B) the rear part of the cylinder (110) comprises at least one longitudinal groove (119) and the conversion piston (270) comprises, at its periphery, at least one longitudinal rib (274) having a cross section complementing that of the at least one longitudinal groove (119), to cooperate therewith and block the rotation of the front part (260) of the cartridge (200) while leaving the front part (260) of the cartridge (200) free in translation.

2. The disc brake according to claim 1, characterized in that the housing (113) of the cartridge (200) in the stirrup (100) comprises three longitudinal grooves (118) and the conversion piston (270) is provided with three longitudinal ribs (274), the grooves (118) being distributed equi-angularly and the ribs (274) being in positions matching those of the grooves (118).

3. The disc brake according to claim 1, characterized in that the at least one longitudinal groove (118) of the housing (113) has an arcuate cross section, and the rib (274) borne by the conversion piston (270) of the converter has an arcuate cross section substantially corresponding to the cross section of the groove (118).

4. The disc brake according to claim 1, characterized in that the at least one longitudinal rib (274) consists of a branch extending beyond the plate (272) and straddling at least a fraction of axial length of the rear part (210).

5. The disc brake according to claim 1, characterized in that the housing (113) of the cartridge (200) comprises a shoulder (117) that receives a flange (293) of the cage (290) and a peripheral groove (118), wherein the peripheral groove (118) is sized to receive the clip (201).

6. The disc brake according to claim 1, characterized in that the cage (290) is a part made of elastic steel of overall tapered form, wherein the cage includes a bottom (291), ring bearing blades (292) linked to a flange (293) and intermediate blades (294), wherein the intermediate blades have free ends that receive the clip (201).

7. The disc brake according to claim 3, characterized in that the at least one longitudinal groove (118) of the housing (113) has a semi-circular cross sectional shape.

\* \* \* \* \*